United States Patent [19]
Cooper

[11] 4,107,517
[45] Aug. 15, 1978

[54] OPTO-ELECTRIC DEVICE

[75] Inventor: Peter Raymond Cooper, Enfield, England

[73] Assignee: The Rank Organisation Limited, London, England

[21] Appl. No.: 757,195

[22] Filed: Jan. 6, 1977

[30] Foreign Application Priority Data

Jan. 7, 1976 [GB] United Kingdom .............. 476/76

[51] Int. Cl.² .................. H04B 9/00; G02B 5/14; H01J 5/16; H01J 39/12
[52] U.S. Cl. ................................ 250/199; 250/227; 350/96.15; 350/96.20
[58] Field of Search ................ 250/199, 227, 551; 350/96 R, 96 C, 96.15, 96.20

[56] References Cited

U.S. PATENT DOCUMENTS

| 3,922,063 | 11/1975 | Marrone | 350/96 C |
|---|---|---|---|
| 3,936,144 | 2/1976 | Caton | 350/96 C |
| 4,023,887 | 5/1977 | Speers | 250/227 |
| 4,027,945 | 6/1977 | Iverson | 350/96 R |

Primary Examiner—Howard W. Britton
Attorney, Agent, or Firm—Brisebois & Kruger

[57] ABSTRACT

Apparatus for transmitting an information signal from one to the other of two relatively rotatable members comprises one or a plurality of light sources radiating into a light guide having an output face which extends over a substantial arc of a circle around which are spaced a plurality of optical detectors. The arc of the circle subtended by the output face of the light guide is greater than the circumferential separation between adjacent optical detectors (assuming they are regularly spaced). Various modifications may be made to the light guide in order to attenuate or enhance the transmission or reflection characteristics, particularly at its surface, so as to obtain a uniform illumination along the whole of the arc of the output face thereof from illumination by one or more discrete light sources.

16 Claims, 7 Drawing Figures

OPTO-ELECTRIC DEVICE

The present invention relates to apparatus for transmitting information, and particularly to such apparatus adapted for transmitting information, particularly in the form of radio or television signals, between two relatively rotatable members.

Until now the only way in which information signals could be transmitted between two relatively rotatable members was either by way of leads interlinking the two relatively rotatable members, or by means of electrical slip rings. The former, however, limit the maximum angle of rotation of the two relatively rotatable members, and certainly preclude continuous rotation between the two members. Electrical slip rings, on the other hand, permit continuous rotation between the two relatively movable members but are electrically "noisy" and limited as to the nature of signals which they will readily transmit. If it is desired to transmit complex electrical signals such as radio or television picture signals then slip rings are, in general, unsuitable.

A requirement for such apparatus arises, for example, in television studios where it would be convenient for a camera to be mounted on a pedestal so that it may rotate, or pan, about the pedestal, sometimes for many rotations, without requiring to "unwind", which would be necessary if the pedestal and camera were interlinked by conventional electrical leads. The complex television signal, however, is not readily transmitted by slip rings so that, until now, such a camera arrangement has not been a serious practical proposition. Likewise, for surveillance in many environments, it would be convenient to have a continuously rotating television camera or other detector, but again, the difficulty of transmitting information between the relatively fixed and the relatively rotatable parts of the apparatus make this, until now, an impossibility.

The present invention seeks, therefore, to provide apparatus for accurately transmitting information between two relatively rotatable members which does not restrict the relative rotation between the members, but allows it to be continuous.

According to the present invention apparatus for transmitting information between two relatively rotatable members, so as to permit the relative rotation between the members to be continuous, comprises a plurality of detectors sensitive to electromagnetic radiation, which, when fitted on one of the two relative movable members are located in a circular array, at least one source of electromagnetic radiation to be carried on the other of the two relatively movable members, and a radiation guide also to be carried on the said other of the two relatively movable members, the radiation guide being shaped with an arcuate output face so that, when positioned on the said other of the relatively movable members to receive light from the or each said source of electromagnetic radiation, the radiation output from the radiation guide extends over an arc spanning the two adjacent detectors having the greatest circumferential separation.

In addition to the potential applications mentioned above, the present invention finds applicability for the transmission of information between the turret or body of a military tank and a cupola. For such an application it is necessary to transmit the information with the minimum of electrical interference and the present invention provides a satisfactory solution to this problem.

The gap between the output face of the radiation guide and the radiation sensitive detectors, need not necessarily be small, nor need it be an air gap, since the apparatus will work equally well when submerged in water or other liquid or in an atmosphere other than air, such as, for example, noxious gases. The only requirement for satisfactory transmission of information is that the angle subtended by the radiation transmitted from the output face of the radiation guide should encompass the space between two adjacent radiation sensitive detectors and, if these detectors are not equally spaced in the circular array, should encompass the space between the two adjacent detectors having the greatest circumferential spacing. The relatively rotatable part may thus turn continuously while transmitting information, and there is no restraint whatsoever on the number of rotations which may be made while transmitting information, nor is there any requirement for rotation in the opposite sense to be made, although such opposite rotation can readily be made should it be desired for any other reason.

The or each source of electromagnetic radiation may operate to transmit electromagnetic radiation, for example, in the infra-red or microwave region, suitable detectors being provided to detect the frequencies transmitted by the radiation source, or alternatively the radiation source may be a light source, in which case the detectors would be optical detectors and the radiation guide would be a light guide.

The light source and light guide may be fitted on either of the two relatively rotatable members in a suitable position to transmit light towards the detectors on the other of the two members.

Preferably, there are further provided means for modulating the light output of the said light source with one or many signals in order to carry the required information, although the information may be digitized simply by turning the source on and off if required. Conveniently, the light source is a light emitting diode, although any other suitable light source may be used.

The array of detectors are preferably all connected to a detector circuit which is tuned in such a way that variations in ambient illumination do not provide spurious signals. It is preferred that the output face of the light guide is diffuse so there is a fairly even illumination across the whole of the output face exposed to the detectors in order to reduce variations in detected light output as the light guide is moved past the detector array, or vice versa.

In order to ensure that the intensity of illumination of the output face of the light guide is as even as possible, to avoid fluctuations in the signal due to relative movement of the two members there may be provided a plurality of sources spaced along an input face of the light guide. Alternatively, or additionally the light guide itself may be provided with means for modifying the intensity of illumination of the output face by selective attenuation or enhancement by means of surface features such as grooves or flutes (or, conversely, ridges) in some or all of the surfaces at which internal reflection takes place. Likewise the major faces of the light guide may be substantially flat and parallel or inclined to one another, and some or all of the surfaces may be provided with reflective coatings modifying the properties of the surface at different regions thereof in such a way that the light emitted by one or a plurality of discrete sources should provide an illumination at the output face of the light guide which is as even as possible over the whole of the area of the output face of the light guide.

One embodiment of the present invention will now be more particularly described, by way of example, with reference to the accompanying drawings, in which.

Figure 1:
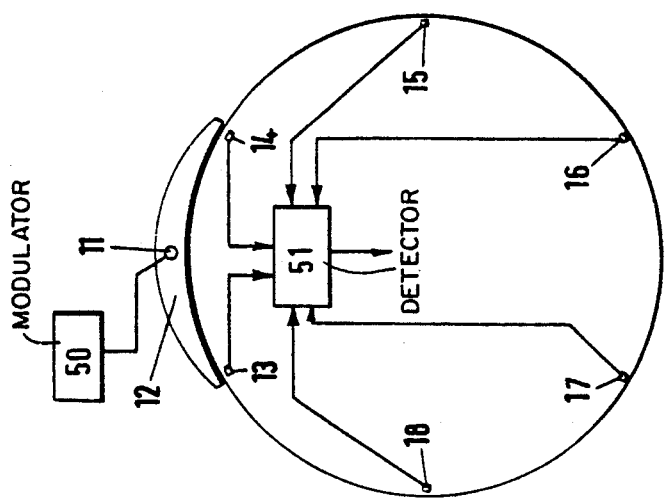
FIG. 1 is a schematic diagram of an assembly formed as a first embodiment of the present invention.
Figure 3:
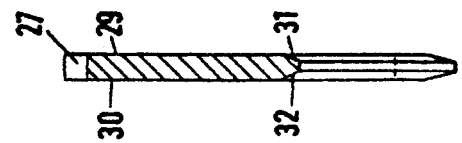
FIG. 3 is a cross-section on the line III—III of FIG. 2.
Figure 2:
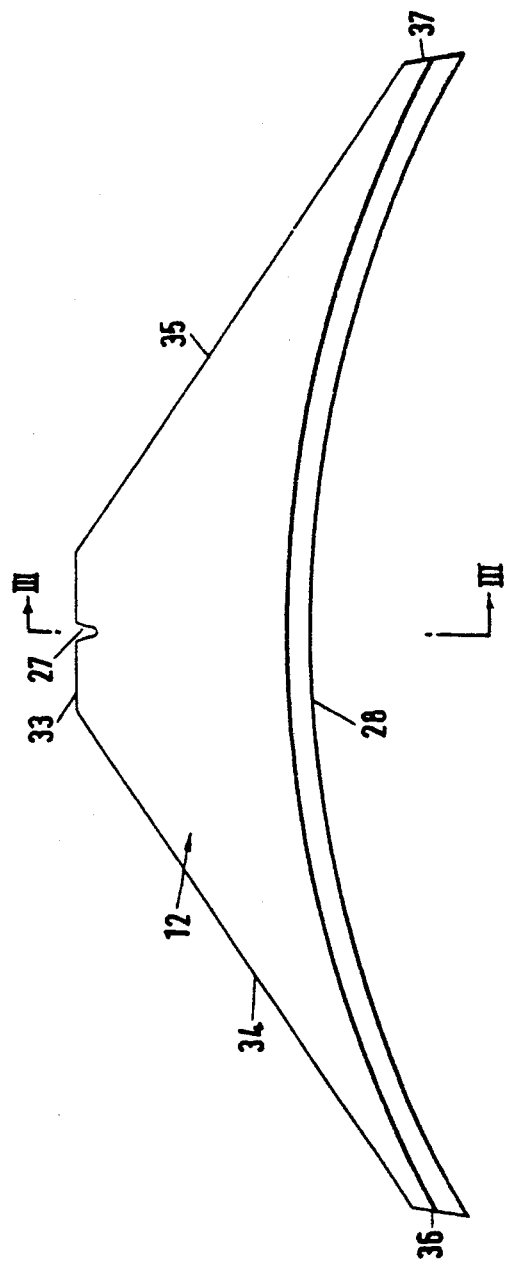
FIG. 2 is an enlarged plan view of the light guide forming part of the embodiment of FIG. 1.

Referring now to FIGS. 1, 2 and 3 there is shown, schematically, a light source 11, which feeds light to an arcuate light guide 12 which is so shaped that light from the source 11 is transmitted from a radially inner arcuate face 28, in a substantially radial direction. In the embodiment mentioned above, of use of the apparatus for transmitting information between the turret and the cupola of a military tank, the light guide 12 and the light source 11 would be fitted on the turret, with respect to which the cupola rotates. Carried on the cupola is a circular array of optical detectors 13, 14, 15, 16, 17, 18 the circumferential separation between which is slightly less than the circumferential extent of the radially inner arcuate face 28 of the light guide 12. In the position shown in FIG. 1, therefore, two optical detectors 13, 14 can receive light transmitted from the light source 11 via the light guide 12. At any other angular position of the cupola one of the detectors 13, 14 is displaced away from the light guide 12 and no longer receives light signals, but the other of the two detectors is, by the same movement, moved towards the centre of the light guide and continues to receive optical signals. A modulator 50 for modulating the light source to transmit the appropriate information is also provided.

Referring now particularly to FIGS. 2 and 3 the form of the light guide 12 is shown. This light guide has a rear face 33 with a recess 27 formed therein to receive a light bulb, light emitting diode, or other suitable light source. The inside faces of the recess 27 are highly polished so that minimal light loss is experienced on transmission from the light source (not shown) into the body of the light guide. The light guide 12 is generally flat having two opposite parallel flat walls 29, 30 delimited by two obliquely inclined walls 34, 35 which act to totally internally reflect light incident thereon from the light source housed in the recess 27.

The face opposite the back face 33, the front face 28 of the light guide, is arcuately concavely curved. The region of the light guide immediately adjacent the concavely curved output face 28 is formed by two tapering faces 31, 32. The rear faces 34, 35 are joined to the front face 28 by two inclined faces 36, 37.

Figure 4:
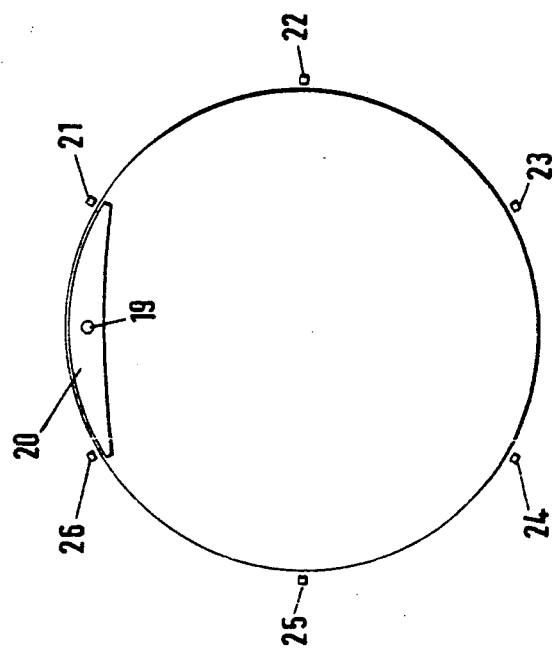
FIG. 4 is a plan view of a second embodiment of the invention.
Figure 6:
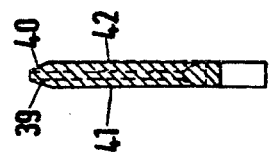
FIG. 6 is a cross section taken on the line VI-VI of FIG. 5.
Figure 5:
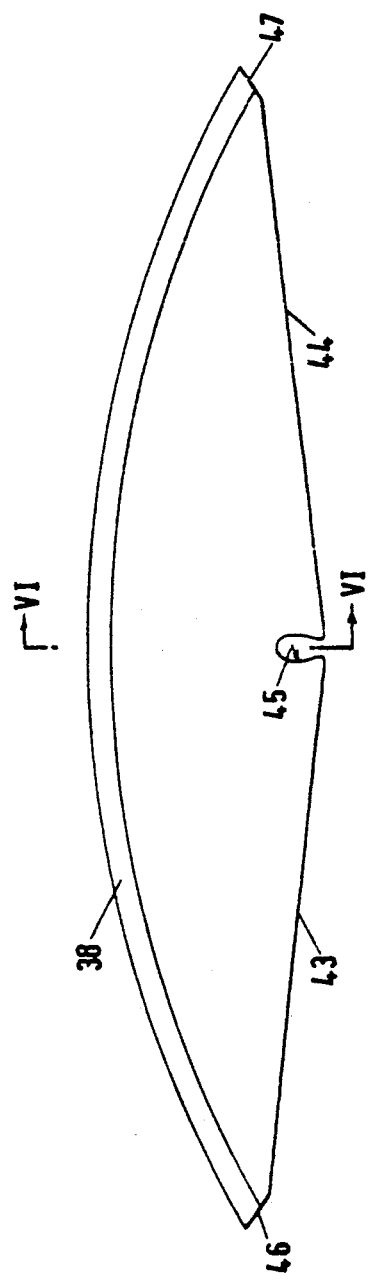
FIG. 5 is an enlarged plan view of the light guide of the embodiment of FIG. 4.

In the embodiment of FIGS. 4 to 6, there is a light source 19 with associated light guide 20 carried on the rotatable cupola and a stationary array of optical detectors 21, 22, 23, 24, 25, and 26 are mounted on the turret. In this embodiment the light guide 20 is convexly curved and has a convex arcuate output face 38. As in the embodiment of FIGS. 1 to 3, the region of the light guide immediately adjacent the output face 38 is tapered, and formed by two inclined faces 39, 40, whilst the main body of the light guide is defined by two parallel faces 41, 42. The light guide has two obliquely inclined rear faces 43, 44 and a deep, highly polished recess 45 to accept a light source such as a light bulb, or light emitting diode, or similar device (not shown). Again, the lateral extremities of the light guide are formed by two inclined surfaces 46, 47 which serve to reflect light, reflected once from the inclined faces 43, 44, towards the arcuately curved output face 38, to ensure an even illumination along the whole of the length of this output face.

In both embodiments, the arcuately curved output face is formed as a diffusing surface to ensure as far as possible an even illumination.

In embodiments in which it is desired to transmit information in both directions, an arrangement in accordance with each embodiment would be required, one for transmitting information to the cupola and one for transmitting information from the cupola. Embodiments of the present invention can also be incorporated with a mechanical slip ring system by means of which electrical power can be transmitted across the interface from one relatively movable member to the other.

Figure 7:
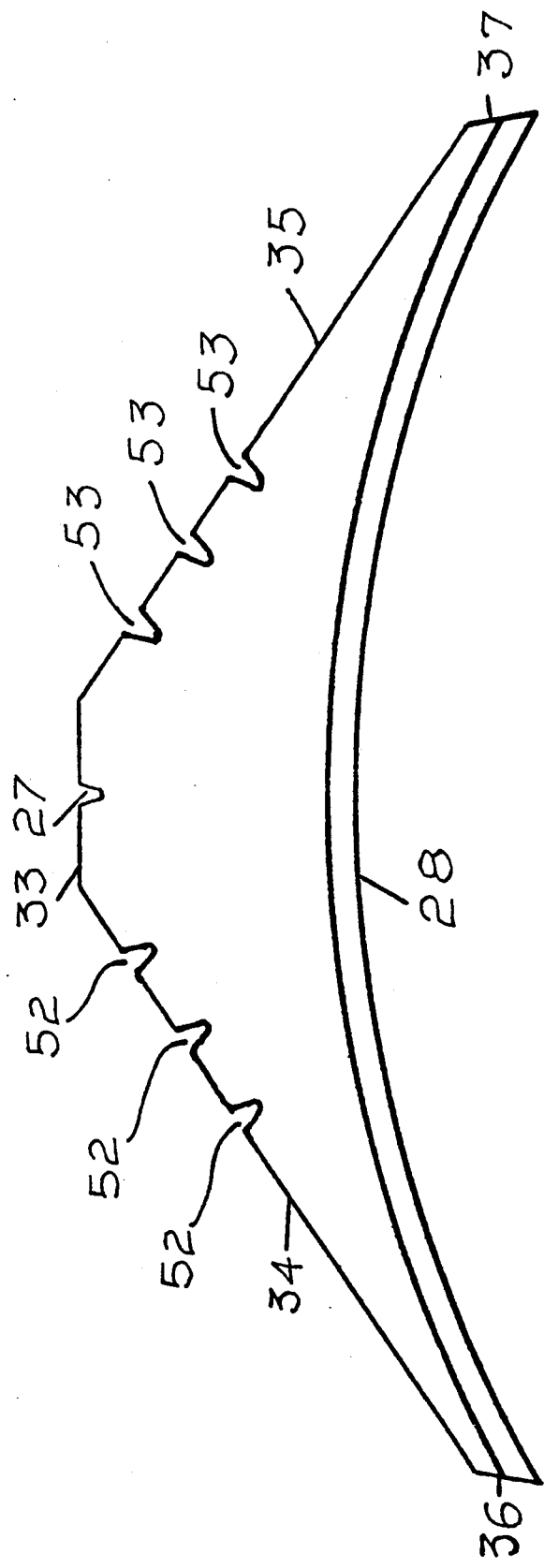
FIG. 7 is a plan view, similar to FIG. 2, of a further form of light guide for use with a plurality of light sources rather than the single light source employed with the light guide of FIG. 2.
Figure 7:
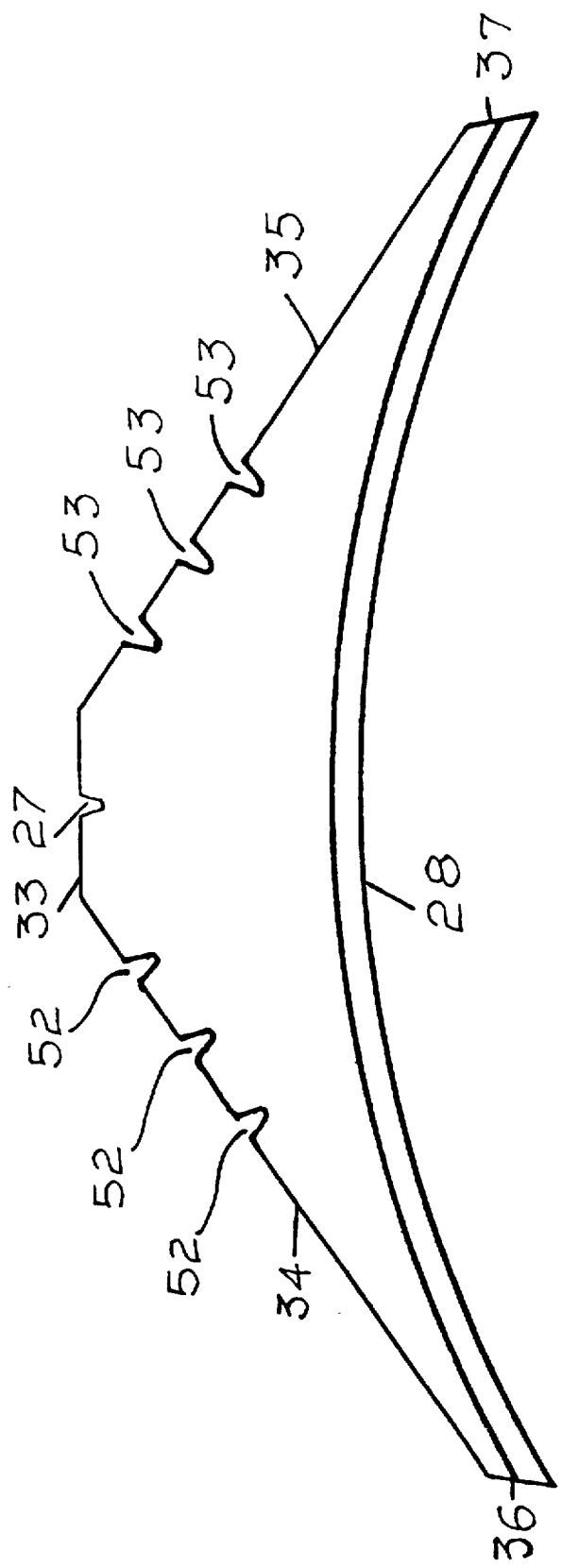

Although in the specific embodiments described above only a single light source is provided in association with each light guide, it will be appreciated that for the purpose of improving the uniformity of intensity of illumination of the output faces 28 or 38 of the light guide 12 shown in FIG. 2 or of that shown in FIG. 5, a plurality of light sources suitably spaced along the faces 34, 35 or the faces 43, 44 may be provided. Likewise, additional light sources may be provided for "back-up" purposes to provide illumination in the event of failure of the light source or one of the light sources. Such a light guide is illustrated in FIG. 7 which is similar in shape to the light guide shown in FIG. 2, but in which there are provided a plurality of recesses 53 along the side 34, and a plurality of recesses 52 along the side 35 for receiving respective light sources which are all linked together and to the modulator 50 illustrated in FIG. 1

In FIG. 1, in addition to the schematically illustrated modulator device 50 operating to modulate the intensity of the light source 11, there is also shown a detector circuit 51 to which all the detectors are connected. The circuit 51 is tuned in such a way that variations in ambient illumination do not produce spurious signals which might lead to incorrect results.

I claim:

1. Apparatus for transmitting information between two relatively rotatable members, so as to permit the relative rotation between the members to be continuous, said apparatus comprising:
   a plurality of detectors sensitive to electromagnetic radiation, which, when fitted on one of the two relatively movable members are located in a circular array,
   at least one source of electromagnetic radiation adapted to be carried on the other of said two relatively movable members, and
   a radiation guide also adapted to be carried on said other of said two relatively movable members, said radiation guide having an arcuate output face so that, when positioned on said other of said relatively movable members to receive light from the or each said source of electromagnetic radiation, the radiation output from said radiation guide extends over an arc at least as great as that spanning the two adjacent detectors having the greatest circumferential separation.

2. Apparatus as in claim 1, wherein said electromagnetic radiation detectors, when fitted are equally circumferentially spaced around a circle on said one member.

3. Apparatus as in claim 1, wherein there are further provided means for modulating said radiation output of said source of electromagnetic radiation.

4. A miltary tank having one part of the information transmission apparatus as in claim 1 fitted to one of the body and a turret of the tank, and the other part to a cupolar thereof, whereby to transmit information between said cupola and one of said body and said turret.

5. Apparatus as in claim 1, wherein said at least one source of electromagnetic radiation is a light source, said detectors sensitive to electromagnetic radiation are optical detectors, and said radiation guide is a light guide.

6. Apparatus as in claim 5, wherein said light source is a light emitting diode.

7. Apparatus as in claim 5, wherein said array of optical detectors are all connected to a detector circuit which is tuned such that variations in ambient illumination do not produce spurious signals.

8. Apparatus as in claim 5, wherein said arcuate output face of said light guide is formed as a diffusing surface.

9. Apparatus as in claim 5, wherein said light guide has at least one shaped recess to receive said at least one light source.

10. Apparatus as in claim 5, wherein there are a plurality of light sources spaced from one another and positioned so that at least part of their output falls on said light guide.

11. Apparatus as in claim 5, wherein said light guide is generally flat and said output face thereof extends transverse the major plane thereof, and wherein the portion of said light guide immediately adjacent said output face is tapered towards this face.

12. Apparatus as in claim 11, wherein the major faces of said light guide are inclined to one another at least over a portion of their area.

13. Apparatus as in claim 11, wherein there are surface features, being at least one of flutes, grooves and ridges on at least one of the major faces of said light guide serving to attenuate the illumination of selected parts of said output face of said light guide.

14. Apparatus as in claim 11, wherein at least part of the surface of said light guide has a coating which modifies the reflectivity thereof whereby to attenuate the illumination at selected parts of the output face of the light guide.

15. Apparatus as in claim 11, wherein there are surface features, being at least one of flutes, grooves and ridges, on at least one of the major faces of said light guide serving to enhance the illumination of selected parts of said output face of said light guide.

16. Apparatus as in claim 11, wherein at least part of the surface of said light guide has a coating which modifies the reflectivity thereof whereby to enhance the illumination at selected parts of the output face of said light guide.

* * * * *

UNITED STATES PATENT AND TRADEMARK OFFICE
CERTIFICATE OF CORRECTION

PATENT NO. : 4,107,517
DATED : August 15, 1978
INVENTOR(S) : Peter Raymond Cooper It is certified that error appears in the above—identified patent and that said Letters Patent is hereby corrected as shown below:

Sheet No. 4 containing Figure 7 should be inserted respectively as part of the above-identified patent.

Signed and Sealed this

Thirteenth Day of January 1981

[SEAL]

Attest:

SIDNEY A. DIAMOND

Attesting Officer     Commissioner of Patents and Trademarks